United States Patent [19]

Natesh

[11] Patent Number: 4,660,859

[45] Date of Patent: Apr. 28, 1987

[54] PROCESS FOR INCORPORATING A NOVEL NUCLEAR SIGNATURE ON CURRENCY WHICH PERMITS EASY AUTHENTICATION AT A LATER DATE

[75] Inventor: Ram Natesh, Centerville, Utah

[73] Assignee: Materials Research, Inc., Centerville, Utah

[21] Appl. No.: 745,445

[22] Filed: Jun. 17, 1985

[51] Int. Cl.[4] ........................ B42D 15/00; G09F 3/02; C08J 1/02

[52] U.S. Cl. .................................. 283/70; 250/492.1; 378/44; 378/190; 378/1; 378/70; 283/57; 283/901; 283/904

[58] Field of Search ................. 250/492.1; 283/70, 85, 283/87, 93, 105, 901, 904, 57; 378/44, 190, 210, 70

[56] References Cited

U.S. PATENT DOCUMENTS

| | | | |
|---|---|---|---|
| 3,802,101 | 4/1974 | Scantlin | 283/904 |
| 4,455,039 | 6/1984 | Weintzen et al. | 283/901 |
| 4,504,084 | 3/1985 | Jauch | 283/901 |

*Primary Examiner*—Craig E. Church
*Assistant Examiner*—T. N. Grigsby

[57] ABSTRACT

A new process for marking currency to permit easy and positive authentication at a later date comprising exposing a small region of the currency to bombardment by high energy neutrons for a short period, treating the exposed small region with a chemical reagent which reacts with the treated area to form tiny holes which can later be used for authentication. Also provide is a method for authentication which comprises exposing the marked currency to monochromatic X-rays, allowing the transmitted beam to impinge upon a fluorescent screen which will show shiny dots where the beam has reached the screen, said dots corresponding to the tiny holes in the marked currency.

12 Claims, 2 Drawing Figures

PROCESS FOR INCORPORATING A NOVEL NUCLEAR SIGNATURE ON CURRENCY WHICH PERMITS EASY AUTHENTICATION AT A LATER DATE

BACKGROUND OF THE INVENTION

1. Field of the Invention

This invention relates to a new process for marking currency with a nuclear signature to permit easy and positive authentication at a later date. More particularly, the invention relates to a new process for marking currency with a nuclear signature which uses equipment not available to the public and thus impossible to duplicate or counterfeit.

(As used herein "signature" and "marking" refers to the incorporation of a permanent mark on currency which can later be indentified and authenticated.)

Specifically, the invention provides a new process for marking currency to permit easy and positive later authentication which uses advanced nuclear reactor or linear accelerators, which are not available to the public and securely protected. The new process broadly comprises exposing a small region of the currency to bombardment by high energy neutrons for a short period to effect a high state of excitation in the atoms of the exposed region, and then treating the exposed small region with a chemical reagent which reacts with the excited atoms and leaves tiny holes in the said exposed region which can later by identified.

The invention further provides a special embodiment wherein separate material, such as mylar tape, is treated as in the above process and then incorporated into the preparation of the currency so the finished currency will still contain the desired markings.

The invention further provides a process for authentication of the currency which has been marked as above which process comprises exposing the marked currency to monochromatic X-ray source, allowing the transmitted beam to impinge upon a fluorescent screen which will show shiny dots where the beam has reached the screen, said dots corresponding to the tiny holes in the marked currency. Conventional optical detection (photographic) and computer interfacing will permit rapid evaluation and compliation of data.

2. Prior Art

The fabrication and circulation of counterfeit United States currency has grown into a major problem. The yearly increase in counterfeit currency is estimated to be between 8% and 16%. According to the Wall Street Journal, about $87 million in counterfeit was confiscated during 1984 alone. Presence of large amounts of counterfeit money has many undesirable effects on the society as well as on the economy.

While techniques do exist to distinquish between authentic and counterfeit bills, these methods are generally time consuming, expensive, and cumbersome. In addition, since sophisticated techniques of counterfeiting are presumably in criminal hands, the services of an expert is required to distinquish the real from the counterfeit currency.

What then is needed is a rapid, inexpensive and simple technique of detection which can distinquish between authentic and counterfeit currency and which can be operated by less skilled employees.

It is an object of the invention therefore to provide a new process for marking currency for easy and positive later authentication. It is a further object to provide a process for marking currency for later identification which is rapid, inexpensive and easy to operate. It is a further object to provide a process for marking currency for later identification which uses equipment not available to the public and impossible to duplicate by counterfeiters. It is a further object to provide a process for marking currency which imparts a marking in a very small area and which is impossible to detect other than with the required equipment. It is a further object to provide a process for marking currency which permits rapid and positive authentification by the use of equipment that will readily be available to all banks and other institutions. It is a further object to provide a method for marking currency for later authentification which provides a detection system which can be operated by even those of limited skills. These and other objects will be apparent from the following detailed description thereof.

SUMMARY OF THE INVENTION

It has now been discovered that these and other objects of the invention can be accomplished by the new process of the present invention which presents for the first time a process for marking which is impossible to duplicate by members of the public and which can be easily and quickly checked for authentification by even those of limited skills.

The new process of the present invention broadly comprises exposing a small region of the currency to be marked to bombardment by high energy neutrons from an advanced nuclear reactor or linear accelerator for a short period to effect a high state of excitation in the atoms of the exposed region, and then treating the exposed small region with a chemical reagent which reacts with the excited atoms and leaves tiny holes in the said exposed region which can later by used for authentication.

As a secial embodiment, one can first mark a separate material, such as mylar tape, by the above-noted procedure and then incorporate the treated material in the preparation of the currency so that the finished currency will still contain the desired marking.

As a further special embodiment, the invention provides a special process for detecting the markings on the currency treated as noted above which comprises exposing the marked currency to monochromatic X-ray source, allowing the transmitted beam to impinge upon a fluorescent screen which will show shiny dots where the beam has reached the screen, said dots corresponding to the tiny holes in the marked currency. Conventional optical detection and computer interfacing will permit rapid evaluation and compliation of data.

It has been found that the above process provides for the first time an inexpensive, quick and efficient way for marking currency for later positive identification. The holes produced by the above process are confined to a very small area. For example, a 12 digit number will occupy a linear distance of 1.6 $\mu$m and cannot be detected by the human eye. Each digit will generally consist of 10 or more holes. These holes are typically 100 A to 200 A in diameter, with maximum diameter on the order of 20 $\mu$m. It is believed that no other technique exists which can produce such small highly uniform, circular shaped holes. The size, shape, and distribution of these holes may be varied by varying the experimental conditions, such as the neutron energy, target material, time of irradiation, geometry of the target material (location of the target material within the nuclear reactor), etc. The holes, for example, can be used to form letters, numbers, symbols, etc. which can be utilized for special identification.

DETAILED DESCRIPTION OF THE INVENTION

Figure 1:
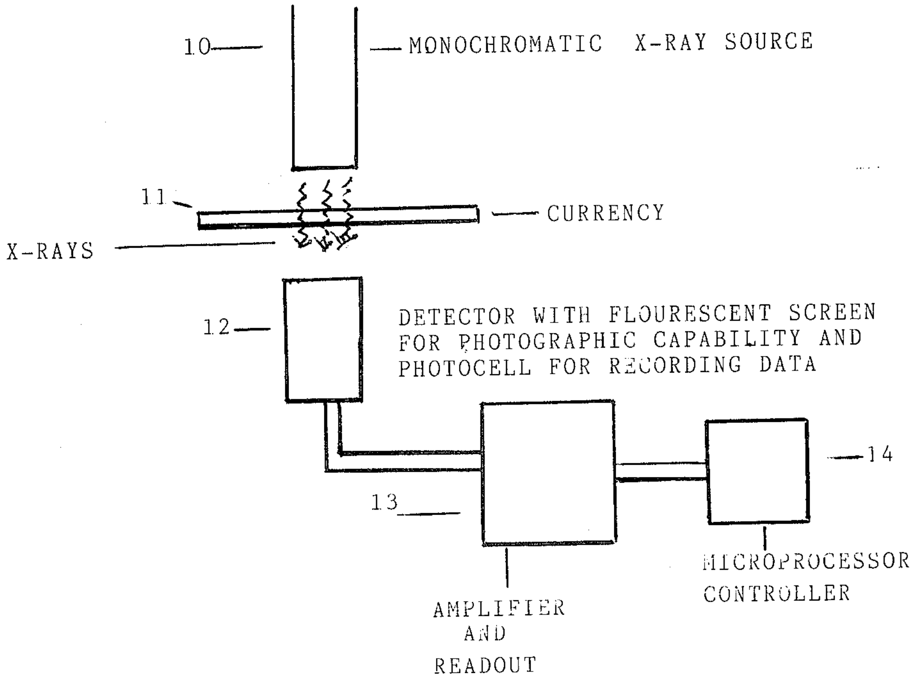
FIG. 1 of the drawing is a schematic diagram of a preferred arrangement of apparatus for authentication of the markings on the currency.

The concept of the invention is as follows: When high energy neutrons bombard a solid material, the neutrons may interact with the atoms of the target material in a variety of ways. Under suitable experimental conditions, the atoms of the target may be subjected to a high degree of excitation without leaving a stable lattice position. This causes very high temperatures for very short times ($10^{-11}$ seconds) in very small regions (about 100 A) of the target. Such regions are called thermal spikes. The atoms of the target in these regions are in a very high state of excitation (strong vibrational states.) These regions cool very rapidly and have high chemical potential.

When immersed in a suitable chemical reagent, the excited material of the target is preferentially attacked (etched) thereby leaving tiny holes. As noted, these holes are typically 100 A to 200 A in diameter, with maximum diameter on the order of 20 μm.

The radiation needed to effect the above result is preferably an advanced nuclear reactor or linear accelerator which are extremely expensive and under great deal of protection. The energy required preferably varies from 300 eV to about 500 MeV, and the exposure time generally is less than 1 minute but may vary depending on the type of currency to be treated.

A description of the equipment needed for producing the high energy neutrons and the experimental conditions for their use are described in textbook Foster et al—"Basic Nuclear Engineering", Allyn and Bacon, Inc. 1968, and such is incorporated herein by reference.

The type of currency to be marked by the above process or the type of material to be marked and then incorporated into the currency may be of any type where the above-noted thermal spike is possible. This includes paper currency of all nations, as well as metal coins and the like that need to be marked to permit later authentication. The tapes or material to be marked and then included in the manufacture of the paper currency may be of any type, natural or synthetic, which permits the thermal spiking, such as polycarbonate films, mylar tapes, nylon films, and the like. The thickness of the currency and tapes may vary over a wide range. The paper currency, for example, may vary from about 0.01 inch to 0.006 inches. In general, the thicker the material to be treated, the higher energy of the neutrons needed to effect the desired result.

The chemical reagents employed in the etching or formmation of the holes may vary over a wide range depending upon the composition of the currency being treated, i.e. paper, metal alloys, etc. In general, the reagents may vary from dilute to strong acids or bases as well as specially prepared inorganic or organic reactants. With paper currency the preferred reagents include, among others sodium hydroxide, sodium sulfite, chlorine, hydrochloride, chlorine dioxide, hydrogen peroxide, and the like. The reagents to be used in each case can best be determined by a series of simple experiments.

After treatment with the chemical reagent, the currency is washed or otherwise treated as needed to neutralize the reagent, dried and then put to use.

As noted a preferred embodiment of the invention is to generate tiny holes in a separate material, such as mylar tape, which can be later embedded in currency bills during the manufacture of the currency paper. The U.S. is currently examining the feasibility of using mylar tapes in currency bills. In this case, it may be possible to irradiate the rolls of mylar tape, and then etch the tape to create the holes, and then added to the currency. The size and distribution of the holes will be precisely characterized using a scanning electron microscope. This information will be recorded, preferably in a computer which will be made available to major financial institutions in the world. In addition, the irradiated and etched mylar tapes will also be characterized using X-ray diffraction techniques. These characterization techniques will precisely give the size, shape, and distribution of these holes in the mylar tape (or the bills, if the currency bills are irradiated and etched). Subsequently, the mylar tape will be incorporated in the currency bills. The paper for the currency bills will be made of two layers of paper, between which the mylar tape will be embedded and cut to size during the paper making process. Such papers can then be used to print currency. The presence of extremely tiny and precisely regular holes in a carefully chosen distribution of these holes provides a unique signature, which will be virtually impossible for counterfeiters to duplicate.

Detection of the Marking

For the detection of the marking on the currency a rapid and inexpensive technique is required. Techniques, such as scanning electron microscopy are not suitable due to the time and expense involved, as well as possible destruction of the currency. Optical techniques using standard visible light and lasers are unsuitable for two reasons, 1. the texture of the bill will cause profuse scattering, and 2. no diffraction phenomenon is possible since the wave length of the radiation is much larger than the hole size and interhole spacing.

According to the process of the present invention, the markings are detected by using wide angle as well as small angle X-ray diffraction. Specifically, the technique consists of using soft X-rays (wave length on the order of 50 A to 100 A), which impringe upon the currency or the mylar tape embedded in the currency paper. Since the tiny holes are more or less regularly spaced, the X-rays which easily penetrate the paper without deviation, will cause Fraunhoffer diffraction in the transmitted beam. The transmitted beam will be allowed to impinge upon a fluorescent screen, which when viewed on the opposite side will show a uniform array of shiny dots. These dots correspond to the holes created in the paper or mylar tape. Conventional optical detection (photographic) and computer interfacing will permit rapid evaluation and compilation of data. Such a detection system can be manufactured as a complete unit at a relatively low cost and used in every major financial institution in the USA and abroad.

Such a preferred detection system is illustrated in the drawing attached wherein 10 refers to the monochromatic X-ray source, 11 the currency being tested, 12 the detector with fluorescent screen and photographic capability and photocell for recording data, 13 the amplifier and readout and 12 the microprocessor.

Figure 2:
FIG. 2 is a photograph of a surface of a polycarbonate membrane which was irradiated in a nuclear reactor to produce excited atoms and subsequently etched to produce holes. The photo was taken at 10 kV in a scanning electron microscope at a magnification of 5000×. The holes produced by the etching are apparent throughout the photo picture.

Referring to the drawing, FIG. 2 therein is a photograph of a surface of a polycarbonate membrane which was irradiated in a nuclear reactor to produce excited atoms and subsequently etched to produce holes. The photo was taken at 10 kV in a scanning electron microscope at a magnification of 5000×. The holes produced by the etching are apparent throughout the photo. The marked sample was coated with gold under vacuum. the purpose of using gold is to make the surface of the sample electrically conductive.

A sample of an unmarked $5.00 bill was treated in the same manner as above, but showed no holes which could be confused with the above-noted markings.

At present, a laser beam technology is used to drill tiny holes in electronic material, such as silicon. The disadvantage of laser beams are two fold, 1. the holes are bigger in diameter because of the inherent property of the laser source, 2. use of energetic laser pulse can localize melting of the electronic material and alter the electronic properties. By using our technology of producing thermal spikes and subsequent etching, both of the above disadvantages of laser technology can be avoided. Thus, our method can be used to drill extremely small diameter (e.g. about 100 A or more) holes in an electronic material, such as silicon.

The new process of the invention is thus ideally suited for use in drilling holes in other materials, such as the above-noted electronic material.

I claim as my invention:

1. A process for marking currency to permit easy authentication at a later date which comprises irradiating a region of the currency by exposing the said region to bombardment by high energy neutrons to effect a high state of excitation in the atoms of the exposed region, and treating the exposed region with a chemical reagent which reacts with the excited atoms and leaves tiny holes in the said exposed region which can later be authenticated.

2. A process as in claim 1 wherein the currency is United States paper currency.

3. A process as in claim 1 wherein the currency is a metal coin.

4. A process as in claim 1 wherein the region exposed is sufficient to form a 12 digit number.

5. A process as in claim 1 wherein the tiny holes formed vary from about 100 A to 200 A in diameter.

6. A process as in claim 1 wherein the radiation energy varies from about 300 eV to 500 MeV.

7. A process as in claim 1 wherein the radiation is first accomplished on a thin mylar tape which is subsequently embedded in the currency during its manufacture.

8. A process as in claim 1 wherein the chemical reagent is a dilute acid which reacts with the excited atoms to form holes in the exposed area.

9. A process as in claim 1 wherein the time of irradiation is less than about 1 minute.

10. A process for authenticating markings on currency which has been treated by irradiating a region of the currency by exposing the said region to bombardment by high energy neutrons to effect a high state of excitation in the atoms of the exposed region, and treating the exposed region with a chemical reagent which reacts with the excited atoms and leaves tiny holes in the said exposed region, the process of authenticating comprising exposing the treated currency to a monochromatic X-ray source, allowing the transmitted beam to impinge upon a flourescent screen which will shown shiny dots where the beam has reached the screen, said dots corresponding to the tiny holes in the marked currency.

11. A process as in claim 10 wherein optical detection and computer interfacing are employed to permit rapid evaluation and compilation of results of the authentication.

12. A process as in claim 10 wherein the X-rays have a wave length of the order of 50 A to 100 A.

* * * * *